(12) United States Patent
Nobuta et al.

(10) Patent No.: US 6,998,190 B2
(45) Date of Patent: Feb. 14, 2006

(54) BATTERY HAVING A SHEET CURRENT COLLECTOR FLUID-TIGHTLY SEPARATING BASIC CELLS

(75) Inventors: Tomoki Nobuta, Miyagi (JP); Toshihiko Nishiyama, Miyagi (JP); Hiroyuki Kamisuki, Miyagi (JP); Gaku Harada, Tokyo (JP); Masato Kurosaki, Tokyo (JP); Yuji Nakagawa, Tokyo (JP); Masaya Mitani, Miyagi (JP)

(73) Assignee: NEC TOKIN Corporation, Miyagi (JP)

( * ) Notice: Subject to any disclaimer, the term of this patent is extended or adjusted under 35 U.S.C. 154(b) by 0 days.

(21) Appl. No.: 10/346,102

(22) Filed: Jan. 17, 2003

(65) Prior Publication Data

US 2003/0165735 A1 Sep. 4, 2003

(30) Foreign Application Priority Data

Jan. 21, 2002 (JP) .............................. 2002-011506

(51) Int. Cl.
*H01M 6/46* (2006.01)

(52) U.S. Cl. ...................... 429/153; 429/160; 429/149
(58) Field of Classification Search ................ 429/153, 429/149, 160, 211, 128, 129, 161, 162, 163, 429/152, 185, 174
See application file for complete search history.

(56) References Cited

U.S. PATENT DOCUMENTS 5,227,960 A 7/1993 Kunishi et al.

| | | |
|---|---|---|
| 2001/0028546 A1 | 10/2001 | Kasahara et al. |
| 2002/0006546 A1 | 1/2002 | Sakata et al. |
| 2003/0134190 A1 * | 7/2003 | Ishida et al. ................ 429/162 |

FOREIGN PATENT DOCUMENTS

| | | | |
|---|---|---|---|
| JP | 60-3867 | | 1/1985 |
| JP | 60-97545 | | 5/1985 |
| JP | 61-91871 | | 5/1986 |
| JP | 63-121244 | | 5/1988 |
| JP | 04-237109 | | 8/1992 |
| JP | 06-029154 | | 2/1994 |
| JP | 06-216313 | * | 8/1994 |
| JP | 08-078291 | | 3/1995 |
| JP | 07-240347 | | 9/1995 |
| JP | 08-083596 | | 3/1996 |
| JP | 2000-235851 | | 8/2000 |
| JP | 2000-299130 | | 10/2000 |
| JP | 2001-217165 | | 8/2001 |
| JP | 2001-244155 | | 9/2001 |
| JP | 2001-332241 | | 11/2001 |
| JP | 2002-298798 | | 11/2002 |

\* cited by examiner

*Primary Examiner*—Raymond Alejandro
(74) *Attorney, Agent, or Firm*—Young & Thompson

(57) ABSTRACT

A small battery and an electric double layer capacitor exhibit adequate cell voltage and capacitor withstand voltage. Specifically, the battery or electric double layer capacitor includes basic cells having a pair of electrodes oppositely laminated via the separator, and an electrolyte are packaged in a resin sheet package. The basic cells are laminated in series via a sheet current collector. The sheet current collector extends to an edge of the resin sheet package around the periphery of the basic cells laminated on both sides of the current collector. The sheet current collector is glued or fused to the resin sheet in its edge. The adjacent basic cells via the sheet current collector are fluid-tightly separated within the resin sheet package.

10 Claims, 2 Drawing Sheets

BATTERY HAVING A SHEET CURRENT COLLECTOR FLUID-TIGHTLY SEPARATING BASIC CELLS

BACKGROUND OF THE INVENTION

1. Field of the Invention

This invention relates to a battery and an electric double layer capacitor which are packaged in a resin sheet.

2. Description of the Related Art

Recent downsizing and weight reduction of mobile devices in information communication applications have led to intensive attempts to develop smaller and lighter batteries and electric double layer capacitors while being capable of rapid charge/discharge.

For meeting the needs for smaller and lighter batteries and electric double layer capacitors, it has been proposed to use a laminated film composed of a polymer film layer and a metal foil layer as an outer package material. For improving rapid charge/discharge properties, a metal plate made of, for example, copper having a smaller electric resistance is employed as a terminal.

Japanese Laid-open Patent Publication No. 8-83596 has disclosed a thin card battery wherein a closed battery package consisting of laminated films comprises laminated layers of a cathode, a separator and an anode as well as an electrolyte. Such a battery, however, comprises only one basic cell in which a cathode and an anode are oppositely placed via a separator. Thus, an increased voltage requires connecting a plurality of cells in series outside the package, which makes size reduction of a product difficult. Furthermore, when an electrolyte is acidic and a terminal is a metal plate made of, e. g., copper in the battery, an internal resistance is increased probably due to corrosion of the metal terminal plate caused by its contact with the acidic electrolyte.

Japanese Laid-open Patent Publication No. 6-29154 has disclosed an output terminal in an electric double layer capacitor, which acts as an external terminal by being contacted with a polarizable electrode impregnated with a highly corrosive electrolyte. The output terminal has a configuration where a corrosion-resistant conductive sheet covers an outer surface of the metal terminal plate except an external lead. An electric double layer capacitor produced using such a terminal, however, has an increased outer diameter by an increase in a thickness because both sides of the metal terminal plate is covered by the conductive sheet.

Japanese Laid-open Patent Publication No. 4-237109 has disclosed an electric double layer capacitor having a configuration in which a plurality of devices comprising a gasket are laminated and a sheet of current collector is disposed between two devices, and has described that such a configuration may increase a withstand voltage and reduce the number of current collector, resulting in a smaller thickness. Such a configuration, however, still comprises a gasket contributing to a larger outer diameter of a product. Thus, the configuration is insufficiently effective in size reduction.

In Japanese Patent Application No. 2001-103629 (Japanese Laid-open Patent Publication No. 2002-298798), we have proposed a battery and an electric double layer capacitor, in which a metal terminal plate except its lead is sealed by heat sealing between a conductive rubber and an outer laminated material. Such a configuration may be used to prevent corrosion of the metal terminal plate even when the electrolyte is acidic and to reduce a product size because of absence of a gasket. The battery and the electric double layer capacitor, however, have a single basic cell in which a pair of electrodes are oppositely placed via a separator, so that an increased voltage requires connecting a plurality of batteries or capacitors in series outside the closed package. There is, therefore, room for improvement in size reduction of a product for producing a battery or capacitor having a desired voltage or withstand voltage.

SUMMARY OF THE INVENTION

An objective of this invention is to provide a small battery or electric double layer capacitor having an adequate cell voltage or capacitor withstand voltage, in which performance degradation due to corrosion of a terminal can be prevented even when an electrolyte is acidic.

This invention relates to a battery in which basic cells comprising a separator, a cathode and an anode oppositely laminated via the separator, and an electrolyte are packaged in a resin sheet package, wherein the basic cells are laminated in series via a sheet current collector;

the sheet current collector extends to an edge of the resin sheet package around the periphery of the basic cells laminated on both sides of the current collector;

the sheet current collector is glued or fused to the resin sheet in its edge; and the adjacent basic cells via the sheet current collector are fluid-tightly separated within the resin sheet package.

This invention also relates to the battery as described above, wherein at each of the top side and the bottom side of a laminated structure comprising the laminated basic cells, is disposed a metal terminal plate with a lead extending to the outside of resin sheet package;

each of the top side and the bottom side of the laminated structure has a sheet current collector, which is glued or fused to the internal surface of the resin sheet package such that the sheet current collector covers the metal terminal plate except its lead.

This invention also relates to the battery as described above, wherein the resin sheet is a laminated sheet consisting of a resin film and a metal film.

This invention relates to an electric double layer capacitor in which basic cells comprising a pair of polarizable electrodes oppositely laminated via the separator, and an electrolyte are packaged in a resin sheet package, wherein the basic cells are laminated in series via a sheet current collector;

the sheet current collector extends to an edge of the resin sheet package around the periphery of the basic cells laminated on both sides of the current collector;

the sheet current collector is glued or fused to the resin sheet in its edge; and the adjacent basic cells via the sheet current collector are fluid-tightly separated within the resin sheet package.

This invention also relates to the electric double layer capacitor as described above, wherein at each of the top side and the bottom side of a laminated structure comprising the laminated basic cells, is disposed a metal terminal plate with a lead extending to the outside of resin sheet package;

each of the top side and the bottom side of the laminated structure has a sheet current collector, which is glued or fused to the internal surface of the resin sheet package such that the sheet current collector covers the metal terminal plate except its lead.

This invention also relates to the electric double layer capacitor as described above, wherein the resin sheet is a laminated sheet consisting of a resin film and a metal film.

According to the present invention, a plurality of basic cells can be electrically laminated in series via current collectors without using a gasket, and the laminate can be packaged and sealed using a laminated sheet as an outer package material. The number of the laminated basic cells may be appropriately determined to provide a battery or electric double layer capacitor having an required cell voltage or capacitor withstand voltage, respectively. Furthermore, because of absence of a gasket, a volumetric efficiency can be improved and a smaller device can be provided. Even when using an acidic electrolyte, corrosion of a terminal can be prevented and performance deterioration can be, therefore, minimized. Furthermore, this invention can eliminate production steps associated with a gasket so that a production time may be reduced.

DETAILED DESCRIPTION OF PREFERRED EMBODIMENTS

Preferred embodiments of this invention will be described.

Figure 1:
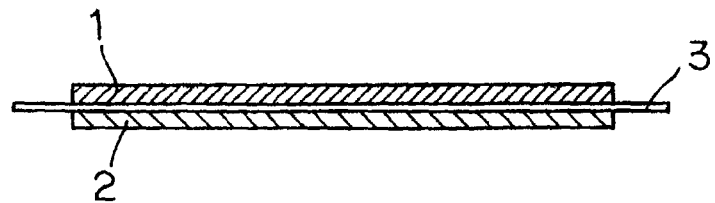
FIG. 1 is a cross-section illustrating the structure of a basic cell in this invention.

FIG. 1 shows a structure of a basic cell where a pair of electrodes are oppositely placed via a separator. In the figure, the symbols indicate the following meanings; 1: a cathode and 2: an anode, in which both are polarizable electrodes in an electric double layer capacitor, and 3: a porous separator. The cathode 1 and the anode 2 are oppositely placed via the separator and contain an electrolyte within them.

An active material in an electrode may be, for a battery, any known organic or inorganic material which can be involved in a redox reaction and, for an electric double layer capacitor, a material capable of storing a charge when being contacted with an electrolyte such as activated carbon powders, activated carbon fibers, solid activated carbon and a composite of activated carbon and polyacene.

For example, a cathodic active material may be an indole trimer represented by chemical formula (1):

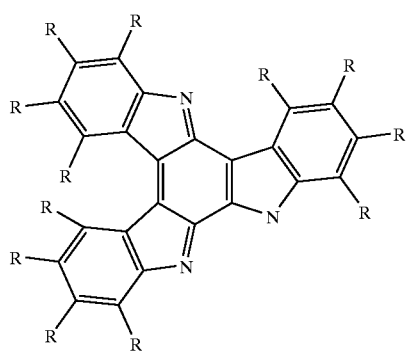

(1)

wherein Rs independently represent H, CN, $NO_2$, F, COOH, etc.

An anodic active material may be a polyphenylquinoxaline represented by chemical formula (2):

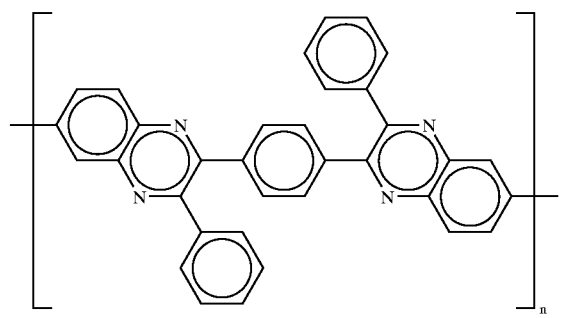

(2)

An electrode used in this invention, specifically a solid electrode having a desired electrode density and a film thickness, may be formed by, for example, placing an electrode material in a mold having a defined size/shape and by molding the material using a hot press. Alternatively, an electrode material is mixed with a solvent to give a paste, which is then deposited by printing on a current collector to form an electrode.

A separator prevents short-circuit caused by contact between a pair of electrodes and allows electrolyte ions to pass through it. It may be a nonwoven fabric or porous film which may be impregnated with an electrolyte.

An electrolyte may be selected from aqueous acidic solutions such as sulfuric acid; aqueous alkaline solutions such as an aqueous potassium hydroxide solution; and non-aqueous electrolytes such as a mixture of an organic solvent (e. g., propylene carbonate) and an electrolyte (e. g., a quaternary ammonium salt).

Figure 2:
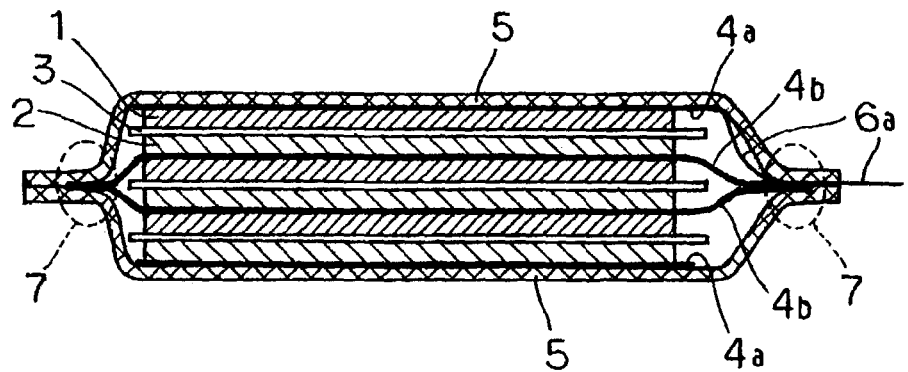
FIG. 2 is a schematic cross-section of a battery according to an embodiment of this invention.
Figure 3:
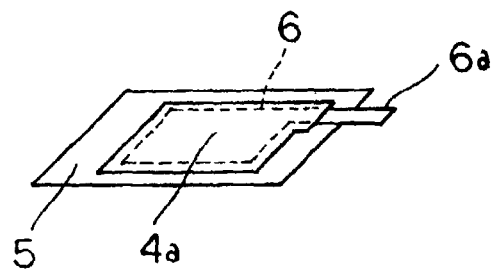
FIG. 3 shows an internal structure of a battery according to this invention.

FIG. 2 shows a schematic cross-section of a battery having a laminated structure as an embodiment of this invention where three basic cells illustrated in FIG. 1 are laminated in series. For a metal terminal plate 6 in FIG. 2, only its lead 6a is shown and the remaining part is omitted. The metal terminal plate 6 may be disposed as illustrated in FIG. 3.

In this invention, basic cells are laminated in series via sheet current collectors 4b, and packaged in a resin sheet 5.

The resin sheet 5 is fluid-tightly glued or fused in a sealing area in its edge to form an outer package. In FIG. 2, the symbol 7 indicates a fusion area. This outer package may be a pair of piled resin sheets, which are glued or fused in a sealing area in its edge, or a folded resin sheet glued or fused in a sealing area in its edge.

A resin sheet is preferably a laminated sheet. Specifically, a laminated sheet having a laminated structure of a resin film and metal film may be used. For example, the laminated sheet may have a three layer structure of an outer package resin film, a metal film and a fusing resin film. Alternatively, it may have a four layer structure for, e. g., preventing short-circuit. Examples of the resin film include a polyethylene resin, an ethylene copolymer resin and a polypropylene resin, and examples of the metal film include aluminum and an aluminum alloy. In particular, a fusing resin film is preferably a resin exhibiting good heat-sealing performance and adhesiveness to a metal; suitably a polypropylene resin and an ionomer resin which is a type of ethylene copolymer resin.

A current collector used in this invention may be a rubber sheet which is endowed with electroconductivity by adding, e. g., carbon.

The current collectors 4b inserted between the basic cells in this invention are disposed such that the basic cells are liquid-tightly separated from each other. Specifically, the current collectors 4b which lie between the basic cells extend to the edge of the resin sheet package around its periphery and glued or fused in the edge of the resin sheet package. For example, during the sealing area in the edge of the resin sheet is fused for forming an outer package, the edge of the extended part of the current collector piled on the edge of the resin sheet may be simultaneously fused to unite them. In this process, when three or more basic cells are laminated via two or more current collectors, it is preferable that an insulating resin is inserted between the current collectors for preventing these current collectors from coming into contact each other. The resin which may be inserted between the current collectors may be the fusing resin film described above, which can ensure insulation between the current collectors and adequate fusion of the current collector edge piled on the edge of the resin sheet during fusing the edge of the resin sheet.

When an electrolyte is acidic in this invention, it is preferable that a sheet current collector 4a is disposed on the electrode in each of the top and the bottom layers in a laminated structure in which basic cells are laminated and each of these sheet current collectors 4a is glued or fused to the inner surface 5 of the resin sheet package such that it covers the metal terminal plate 6 except its lead 6a as illustrated in FIG. 3. Thus, such a configuration can prevent corrosion of the metal terminal plate due to contact between the metal terminal plate and the acidic electrolyte.

EXAMPLES

This invention will be further described with reference to Examples.

Example 1

In this example, a battery shown in FIG. 2 was fabricated, which had a laminated structure of three basic cells in series.

As a cathode 1, a 10 cm$^2$ solid electrode was formed by adding a conduction aid and a binder to a cathodic active material, the indole trimer represented by chemical formula (1) (R at 5-position in the indole unit is —CN and the remaining Rs are —H: 5-cyanoindole trimer); stirring and blending the mixture by a blender to give an electrode powder; placing 0.5 g of the powder in a mold; and pressing it by a hot press.

As an anode 2, a 10 cm$^2$ solid electrode was formed by adding a conduction aid to an anodic active material, the polyphenylquinoxaline represented by chemical formula (2); stirring and blending the mixture by a blender to give an electrode powder; placing 0.5 g of the powder in a mold; and pressing it by a hot press.

Current collectors 4a, 4b were conductive rubber sheets and laminated sheets 5 were laminates of an aluminum foil and a resin film.

As shown in FIG. 3, the surface of a metal terminal plate 6 except a lead 6a was liquid-tightly packaged in the laminated sheet 5 and the current collectors 4a consisting of the conductive rubber sheet. This configuration can prevent corrosion of the metal terminal plate due to contact between the metal terminal plate and an acidic electrolyte. Thus, two sheets were prepared, in which the metal terminal plate 6, the current collector 4a and the laminated sheet 5 are integrated.

On the current collector 4a in one of two laminated sheets 5 prepared above were laminated, via the current collectors 4b, three basic cells in series, which were covered by the laminated sheet 5 such that the other current collector 4a was disposed on the cells. Then, to the vacuumed product was added a given amount of 20 wt % aqueous sulfuric acid solution as an electrolyte for immersion of the electrolyte. Then, a sealing area to be a fused area 7 was sealed by vacuum heat fusion. A lead 6a was drawn outside from a part of the fused area 7.

The current collectors 4b consisting of a conductive rubber sheet had such a size that they can be extended to the edge of a laminated sheet package (outer package), and were overlapped in the edge of two laminated sheets, i. e., the sealing area. Furthermore, between the current collectors were inserted ionomer films and these were fused together.

In the configuration of this example, adjacent basic cells are fully separated by the current collector 4b which lies between them so that the electrolyte is isolated by the current collector 4b which lies between the basic cells.

A volumetric efficiency for the battery of this example (a rate of the volume of the basic cell laminate to that of the outer package consisting of the laminated sheets) was 62.5%. An ESR (equivalent series resistance) for the battery was 60 mΩ. A time taken until sealing in the battery production was 20 min.

In the configuration of this example, a volumetric efficiency was improved because of absence of a gasket. Furthermore, since the basic cells could be directly laminated via a sheet of current collector, the number of current collectors could be reduced in comparison with a battery using a gasket and thus a resistance could be correspondingly reduced (reduction in an ESR). A production time could be reduced because the process dispensed with steps associated with a gasket (vulcanization adhesion, cooling, etc.).

Example 2

A battery was fabricated as described in Example 1, except that an electrode weight was 1.0 g for both cathode and anode.

A volumetric efficiency of the battery of Example 2 was 87.5%. An ESR for the battery was 120 mΩ. A time taken until sealing in the battery production was 20 min. In the configuration of this example, a volumetric efficiency was improved; a cell ESR could be reduced; and a production time could be reduced.

Example 3

A battery was fabricated as described in Example 1, except that ten basic cells were laminated in series and sealed.

A volumetric efficiency of the battery of Example 3 was 90.5%. An ESR for the battery was 200 mΩ. A time taken until sealing in the battery production was 20 min. In the configuration of this example, a volumetric efficiency was improved; a cell ESR could be reduced; and a production time could be reduced.

Example 4

An electric double layer capacitor having a structure as described in Example 1 was fabricated, except that basic cells in which polarizable electrodes were oppositely placed via a separator, were substituted for the basic cells in the battery in Example 1.

A polarizable electrode was produced by mixing activated carbon with the appropriate amounts of carbon powders as a conduction aid and a binder, mixing the mixture with a solvent to form a paste, depositing the paste on the current collector by printing to given size and film thickness, and then dried the product at 120° C. for 1 hour.

On one side of the current collector 4a was deposited a polarizable electrode while on both sides of the current collector 4b were polarizable electrodes. These current collectors with the polarizable electrodes were laminated such that the polarizable electrodes were oppositely placed via a separator to form a laminated structure where three basic cells were laminated in series via the current collectors 4b. Then, the laminated structure was packaged in a laminated sheet. Then, to the vacuumed product was added a given amount of 20 wt % aqueous sulfuric acid solution as an electrolyte for impregnation with the electrolyte. Then, a sealing area to be a fused area 7 was sealed by vacuum heat fusion. A lead 6a was drawn outside from a part of the fused area 7.

The current collectors 4b consisting of a conductive rubber sheet had such a size that they can be extended to the edge of a laminated sheet package (outer package), and were overlapped in the edge of two laminated sheets, i. e., the sealing area. Furthermore, between the current collectors were inserted ionomer films and these were fused together.

A volumetric efficiency for the electric double layer capacitor of Example 4 was 62.5%. An ESR for the electric double layer capacitor was 45 mΩ. A time taken until sealing in the production was 110 min. In the configuration of this example, a volumetric efficiency was improved; a capacitor ESR could be reduced; and a production time could be reduced.

Comparative Example 1

Figure 4:
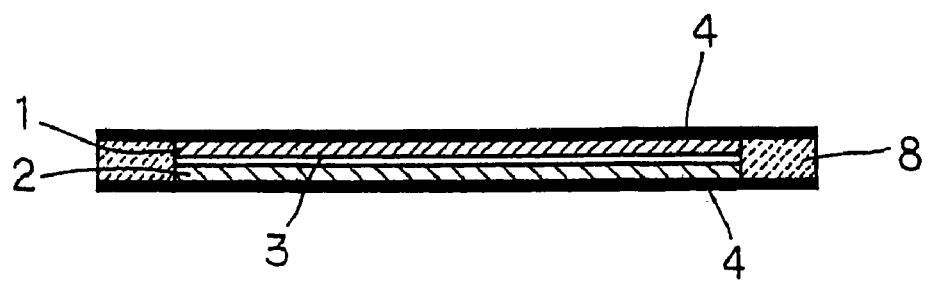
FIG. 4 is a schematic cross-section illustrating a basic cell in a battery according to the prior art.
Figure 5:
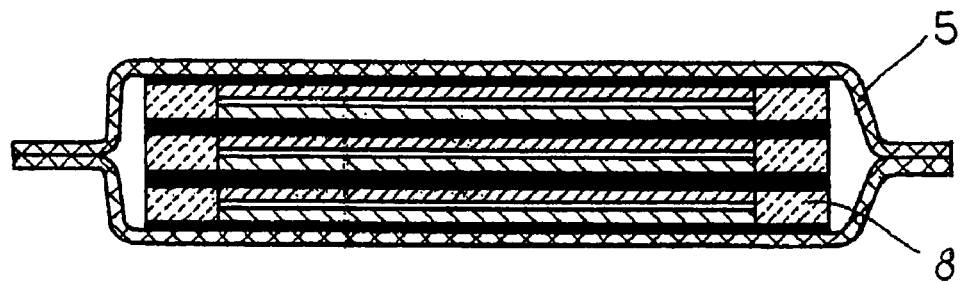
FIG. 5 shows an internal structure of a battery according to the prior art.

In this comparative example, a battery (FIG. 5) where three unit cells (FIG. 4) comprising one basic cell were laminated in series, was fabricated.

A cathode 1 with a size of 10 cm² was formed by adding an appropriate amount of carbon powders as a conduction aid to a cathodic active material, the cyanoindole trimer represented by chemical formula (1) (R at 5-position in the indole unit is —CN and the remaining Rs are —H: 5-cyanoindole trimer) and pressing 0.5 g of the powders by a hot press.

An anode 2 with a size of 10 cm² was formed by adding an appropriate amount of carbon powders as a conduction aid to an anodic active material, the polyphenylquinoxaline represented by chemical formula (2) and pressing 0.5 g of the powders by a hot press.

A rim type gasket 8 was fused by pressure with one current collector 4 consisting of a conductive rubber sheet. Inside of the gasket, a cathode 1 and an anode 2 were oppositely placed via a separator 3. Over the product was placed the other current collector 4 consisting of a conductive rubber sheet and the laminate was sealed by pressing. In this process, sealing was conducted while forming an inlet for injecting an electrolyte. The product was subject to vulcanization adhesion at 120° C. at a pressure of 3 kgf/cm² (2.94×10⁵ Pa) for 2 hours. Then, a 20 wt % aqueous sulfuric acid solution as an electrolyte was injected into the vacuumed product for impregnation with the electrolyte. Then, the inlet was sealed with a plastic material.

Three unit cells thus prepared were laminated in series. On both sides of the laminate were disposed metal terminal plates. The laminate was then packaged in a laminated sheet and was sealed by vacuum hot fusion using an ionomer fusion film. From a part of the fused area, a lead (not shown) was drawn outside.

A volumetric efficiency for the battery in Comparative Example 1 was 33.1%. A battery ESR was 68 mΩ. A time taken until sealing in the production was 205 min.

Comparative Example 2

A battery was fabricated as described in Comparative Example 1 except that an electrode weight was 1.0 g for both cathode and anode.

A volumetric efficiency for the battery in Comparative Example 2 was 39.7%. A battery ESR was 136 mΩ. A time taken until sealing in the production was 205 min.

Comparative Example 3

A battery was fabricated as described in Comparative Example 1 except that ten unit cells were laminated in series and sealed.

A volumetric efficiency for the battery in Comparative Example 3 was 39.7%. A battery ESR was 212 mΩ. A time taken until sealing in the production was 205 min.

Comparative Example 4

An electric double layer capacitor was fabricated as described in Comparative Example 1, except that basic cells in which polarizable electrodes were oppositely placed via a separator, were substituted for the basic cells in the battery in Comparative Example 1.

A polarizable electrode was produced by mixing activated carbon with the appropriate amounts of carbon powders as a conduction aid and a binder, mixing the mixture with a solvent to form a paste, depositing the paste on the current collector by printing to given size and film thickness, and then dried the product at 120° C. for 1 hour.

Then, as described in Comparative Example 1, a gasket and a current collector were subject to vulcanization fusion and a 40 wt % aqueous sulfuric acid solution as an electrolyte was injected to form an electric double layer capacitor comprising one basic cell.

Three electric double layer capacitors were laminated in series, metal terminal plates were disposed on both sides, the product was packaged in a laminated sheet and sealing was conducted by vacuum heat fusion using an ionomer fusion film. From a part of the fused area, a lead was drawn outside.

A volumetric efficiency for the battery in Comparative Example 4 was 33.1%. An ESR of the electric double layer capacitor was 53 mΩ. A time taken until sealing in the production was 205 min.

The results in these examples and comparative examples are summarized in the tables below.

TABLE 1

|  | Volumetric efficiency (%) | ESR (mΩ) | Production time (min) |
| --- | --- | --- | --- |
| Example 1 | 62.5 | 60 | 20 |
| Example 2 | 87.5 | 120 | 20 |
| Example 3 | 90.5 | 200 | 20 |
| Example 4 | 62.5 | 45 | 110 |

TABLE 1-continued

|  | Volumetric efficiency (%) | ESR (mΩ) | Production time (min) |
|---|---|---|---|
| Comp. Example 1 | 33.1 | 68 | 205 |
| Comp. Example 2 | 39.7 | 136 | 205 |
| Comp. Example 3 | 39.7 | 212 | 205 |
| Comp. Example 4 | 33.1 | 53 | 205 |

TABLE 2

| Examples 1 to 3 | | |
|---|---|---|
| Step 1 | 5 min | Metal terminal plates are packaged in a laminate of a conductive rubber sheet and a laminated sheet, and their sheet are fused and sealed by heat. |
| Step 2 | 5 min | An electrode is formed by hot press molding. |
| Step 3 | 5 min | A laminate of basic cells is formed within a laminated sheet package. |
| Step 4 | 5 min | An electrolyte is injected and sealing is conducted. |
| Total | 20 min | |

TABLE 3

| Example 4 | | |
|---|---|---|
| Step 1 | 5 min | Metal terminal plates are packaged in a laminate of a conductive rubber sheet and a laminated sheet, and their sheet are fused and sealed by heat. |
| Step 2 | 5 min | A polarizable electrode is deposited on a current collector. |
| Step 3 | 90 min | The product was dried at 120° C. and cooled. |
| Step 4 | 5 min | A laminate of basic cells is formed within a laminated sheet package. |
| Step 5 | 5 min | An electrolyte is injected and sealing is conducted. |
| Total | 110 min | |

TABLE 4

| Comparative Examples 1 to 3 | | |
|---|---|---|
| Step 1 | 5 min | An electrode is formed by hot press molding. |
| Step 2 | 5 min | A gasket and one current collector are fused by pressure. Inside gasket, basic cells are formed. On the gasket is pressure-fused the other current collector for sealing. |
| Step 3 | 120 min | The gasket and the current collectors are subject to vulcanization adhesion at 120° C. |
| Step 4 | 60 min | The product is cooled. |
| Step 5 | 10 min | An electrolyte is injected and an inlet is sealed. |

TABLE 4-continued

| Comparative Examples 1 to 3 | | |
|---|---|---|
| Step 6 | 5 min | Metal terminal plates are disposed. The product is packaged in a laminated sheet and sealed. |
| Total | 205 min | |

TABLE 5

| Comparative Example 4 | | |
|---|---|---|
| Step 1 | 5 min | A polarizable electrode is deposited on a current collector. |
| Step 2 | 5 min | A gasket and one current collector deposited are fused by pressure. Inside the gasket, a separator is placed on the electrode. On the gasket is pressure-fused the other current collector for sealing. |
| Step 3 | 120 min | The gasket and the current collectors are subject to vulcanization adhesion at 120° C. |
| Step 4 | 60 min | The product is cooled. |
| Step 5 | 10 min | An electrolyte is injected and an inlet is sealed. |
| Step 6 | 5 min | Metal terminal plates are disposed. The product is packaged in a laminated sheet and sealed. |
| Total | 205 min | |

What is claimed is:

1. A battery, comprising:
a plurality of basic cells, each of said basic cells comprising a separator, a cathode and an anode oppositely laminated via the separator, and an electrolyte; and
a resin sheet package containing said plural basic cells, wherein
the basic cells are laminated in series via a sheet current collector;
the sheet current collector extends to an edge of the resin sheet package around an entire periphery of the basic cells, which are directly laminated on both sides of the current collector;
the sheet current collector is glued or fused to the resin sheet in its edge; and
the basic cells via the sheet current collector are liquid-tightly separated within the resin sheet package.

2. The battery as claimed in claim 1, wherein
at each of the top side and the bottom side of a laminated structure comprising the laminated basic cells, is disposed a metal terminal plate with a lead extending to the outside of resin sheet package;
each of the top side and the bottom side of the laminated structure has a sheet current collector, which is glued or fused to the internal surface of the resin sheet package such that the sheet current collector covers the metal terminal plate except its lead.

3. The battery as claimed in claim 1, wherein the resin sheet is a laminated sheet consisting of a resin film and a metal film.

4. The battery as claimed in claim 1, wherein the sheet current collector liquid-tightly separates each of the basic cells from each other.

5. A battery, comprising:
a plurality of basic cells which each comprise a cathode, an anode and a separator between said cathode and said anode;
a current collector directly between a cathode of one of said plural basic cells and an anode of an adjacent one of said plural basic cells;
a resin sheet surrounding said plural basic cells to form a resin sheet package; and
an electrolyte within said resin sheet package,
wherein an entirety of said current collector extends to an edge of said resin sheet package and is connected to said resin sheet at said edge, so that adjacent ones of said plural basic cells are liquid-tightly separated from each other by said current collector.

6. The battery as claimed in claim 5, further comprising:
a first sheet current collector at a top of a laminated structure comprising said plural basic cells laminated in series;
a second sheet current collector at a bottom of said laminated structure;
a first metal terminal plate between the first sheet current collector and said resin sheet package; and
a second metal terminal plate between the second sheet current collector and said resin sheet package, each of said first and second metal plates having a lead extending outside of said resin sheet package such that the first and second sheet current collectors cover a respective one of said first and second metal terminal plates except for said lead.

7. The battery as claimed in claim 5, wherein the resin sheet is a laminated sheet consisting of a resin film and a metal film.

8. The battery as claimed in claim 5, wherein the sheet current collector liquid-tightly separates each of the basic cells from each other.

9. A battery, comprising:
a plurality of basic cells which each comprise a cathode, an anode and a separator between said cathode and said anode;
a first sheet current collector between an adjacent two of said plural basic cells;
a resin sheet surrounding said plural basic cells to form a resin sheet package, wherein an entirety of said first sheet current collector extends to an edge of said resin sheet package and is connected to said resin sheet at said edge, so that adjacent ones of said plural basic cells are liquid-tightly separated from each other by said first sheet current collector;
an electrolyte within said resin sheet package;
a second sheet current collector at a top of a laminated structure comprising said plural basic cells laminated in series;
a third sheet current collector at a bottom of said laminated structure;
a first metal terminal plate between the second sheet current collector and said resin sheet package; and
a second metal terminal plate between the third sheet current collector and said resin sheet package, each of said first and second metal plates having a lead extending outside of said resin sheet package such that the second and third sheet current collectors cover a respective one of said first and second metal terminal plates except for said lead.

10. The battery as claimed in claim 9, wherein the sheet current collector liquid-tightly separates each of the basic cells from each other.

* * * * *